United States Patent
Caldwell

(10) Patent No.: US 10,551,235 B2
(45) Date of Patent: Feb. 4, 2020

(54) ADJUSTABLE FOOD SCOOP

(71) Applicant: Kevin Caldwell, Perth Amboy, NJ (US)

(72) Inventor: Kevin Caldwell, Perth Amboy, NJ (US)

(*) Notice: Subject to any disclaimer, the term of this patent is extended or adjusted under 35 U.S.C. 154(b) by 0 days.

(21) Appl. No.: 16/175,928

(22) Filed: Oct. 31, 2018

(65) Prior Publication Data
US 2019/0128722 A1  May 2, 2019

Related U.S. Application Data

(60) Provisional application No. 62/579,724, filed on Oct. 31, 2017.

(51) Int. Cl.
*G01F 19/00* (2006.01)
*A01K 5/00* (2006.01)

(52) U.S. Cl.
CPC .............. *G01F 19/002* (2013.01); *A01K 5/00* (2013.01)

(58) Field of Classification Search
CPC ................................. G01F 19/002; A01K 5/00
USPC .......................................................... 73/429
See application file for complete search history.

(56) References Cited

U.S. PATENT DOCUMENTS

| | | | |
|---|---|---|---|
| 5,182,948 A * | 2/1993 | Robbins | G01F 19/00 33/426 |
| 5,325,717 A * | 7/1994 | Robbins | G01F 19/00 73/426 |
| 5,460,042 A | 10/1995 | Tucker | |
| D368,864 S | 4/1996 | Weterrings | |
| D371,976 S | 7/1996 | Tucker | |
| 7,086,282 B2 | 8/2006 | Kilduff et al. | |
| 7,503,212 B2 | 3/2009 | Dalla Piazza et al. | |
| 8,327,702 B2 | 12/2012 | Steinkraus | |
| 8,336,377 B2 | 12/2012 | Robbins | |
| 9,103,708 B2 | 8/2015 | Robbins | |

FOREIGN PATENT DOCUMENTS

| | | |
|---|---|---|
| GB | 2437454 B | 2/2009 |
| WO | 2012056069 A1 | 5/2012 |

* cited by examiner

*Primary Examiner* — Jamel E Williams
(74) *Attorney, Agent, or Firm* — Gearhart Law, LLC

(57) ABSTRACT

An adjustable measuring device that contains an elongated scoop, a handle, and a cup and a moveable member configured to adjust a position of the cup, with the scoop forming an open cylinder and the cup being slidable inside of the elongated scoop, and with the handle being elongated in a direction away from the scoop, and having a gauge display.

18 Claims, 3 Drawing Sheets ial application is a United States non-provisional appli-
ADJUSTABLE FOOD SCOOP

CLAIM OF PRIORITY

This application is a United States non-provisional application claiming priority to U.S. provisional patent application No. 62/579,724, filed Oct. 31, 2017, the entire contents of which are incorporated herein by reference.

FIELD OF THE EMBODIMENTS

The field of the embodiments relate to a scoop for measuring and gathering a specific amount of food as measured by weight, volume, and calorie count, specifically for pets, based on the pets' size and activity level.

BACKGROUND OF THE EMBODIMENTS

Today's pets, just like many of their owners, struggle with being overweight and even obesity. An animal's weight can significantly decrease the animal's activity level, which begins a downward spiral of gaining even more weight and becoming even less active. It's a dangerous cycle. For this reason, owners have been trying figure out an easy way limit the amount of food their beloved companions eat and their caloric intake. A need clearly exists for an easy way of collecting food and making sure that it is the right amount. Adjustable measuring cups have been around for a while, however, all of the prior art is poorly adapted to measuring, and serving a proper amount of animal food. Specifically the prior art does provide a way to carefully measure out an amount based on a dogs activity level. The prior art also does not provide a convenient way of serving the food after it has been collected Examples of related art are described below.

U.S. Pat. No. 9,103,708 pertains to a moveable structure of an adjustable measuring device such as a spoon or scoop having a structure molded of a single material with thin flexible curved edges which fit into the internal walls of the housing to provide increased surface. The moveable dam being molded in a single step of a single thermoplastic material to give the device a tapered cross-sectional shape with the inner portion thicker than the outer edges.

U.S. Pat. No. 5,325,717 pertains to a measuring device having a bowl. The bowl's capacity being adjusted by a dam structure located within the bowl and attaching to a cover structure slidably mounted on the bowl. The slidable cover extends beyond the bowl for use as a handle. The handle has a downwardly directed extension which is used to support and stabilize the device when the device rests on a flat surface. The handle also having a rounded indentation at the junction between the extension and the handle, so as to reinforce the junction and provide for easily gripping the device. The sides of the bowl structure being flexible so that they can be squeezed together to release the cover so that the device can easily be disassembled and reassembled for cleaning. A detent structure is provided to locate the sliding dam at pre-marked measurement locations. The detent structure is centrally located to permit strengthening of the sliding attachment and reduce wear.

U.S. Pat. No. 7,086,282 pertains to an adjustable measuring scoop including a movable partition that adjustably rotates on a rotating means such as an axle so as to result in a scoop size that can be selectively determined between a maximum and a minimum by ready manual manipulation of the scoop. The movable partition and rotating means being preferably configured so that the movable partition moves toward and away from the scoop's opening, permitting, e.g., a symmetric frontal contour that may be more effective in scooping from a container. Adjustment of the movable partition may also optionally be effected by means including a manual slide that has a linear and/or relatively short range of motion.

None of the art described above addresses all of the issues that the embodiments of the present invention do. A need still exists for providing a user, an adjustable measuring device which enables one to scoop a specific amount of food, and serve it to a pet. The present application provides an adjustable measuring device with an elongated scoop, a handle, and a cup and a moveable member configured to adjust a position of said cup, with the scoop forming a cylinder with a small front wall, allowing food to be secured momentarily and released easily when served, and the scoop having a gauge display, for easier and more precise adjustment of the scoop volume.

SUMMARY OF THE EMBODIMENTS

Embodiments of the present invention include an adjustable measuring device comprising: an elongated scoop, a handle, a cup and a moveable member configured to adjust a position of said cup. The scoop may be rounded and form a cylinder having an open section. The cup may be mounted inside the elongated scoop and be slidable inside of the elongated scoop. The cup may further have cup side walls, a cup bottom wall, and a cup back wall, and having a generally round shape. The handle of the present invention may further be elongated in a direction away from the scoop, and have a gauge display.

It is another object of the embodiment of the present invention to have the moveable member comprising a round dial connected to a gear system, said gear system connected a shaft connected to the cup back wall. The gear system can be a worm gear.

It is yet another object of the embodiment of the present invention to have the cup engaged with the scoop by a track on an inner surface of the scoop and have the gear system engaged to the cup through an aperture in the rear wall of the scoop.

It is yet another object of the embodiment of the present invention to have the moveable member be configured to slide along the elongated direction of the handle. The moveable member can be integrally connected to the cup back wall with an elongated connection member.

It is yet another object of the embodiment of the present invention to have the elongated connection member comprise a cutout, with the cutout being capable of housing a portion of the gauge. The gauge can be a magnifying glass, and can preferably be prism shaped. The gauge can also be digital.

It is yet another object of the embodiment of the present invention to have the gauge coupled with a rod that can have an outer surface comprising at least 6 sides, and a maximum of 12 sides. Each of the sides can be connected to a unique sliding rod, wherein each of the unique sliding rods can be connected to the cup back wall through an aperture in the rear wall.

It is yet another object of the embodiment of the present invention to have a diagonal edge of the cup flush with a diagonal edge of the scoop, and wherein the second position places the cup back wall in contact with the scoop rear wall. The rear wall can be approximately 80 to 95 percent higher than the front wall. The top wall should be between 30 and 70 percent as long as the bottom wall, leaving a portion of the bottom wall exposed and the inside of the scoop open.

It is yet another object of the embodiment of the present invention that the scoop can be made of plastics, resins, composites, metals, rubbers, wood, or any combination thereof. The plastics specifically include polyethylene terephthalate (PET), polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC), or any combination thereof.

It is yet another object of the embodiment of the present invention that the handle can have a first scale on a first side and a second scale on a second side, wherein the moveable member is connected to a sliding knob, the knob positioned in a slot adjacent to the first scale or the second scale, configured to adjust the cup.

DESCRIPTION OF THE PREFERRED EMBODIMENTS

Figure 1:
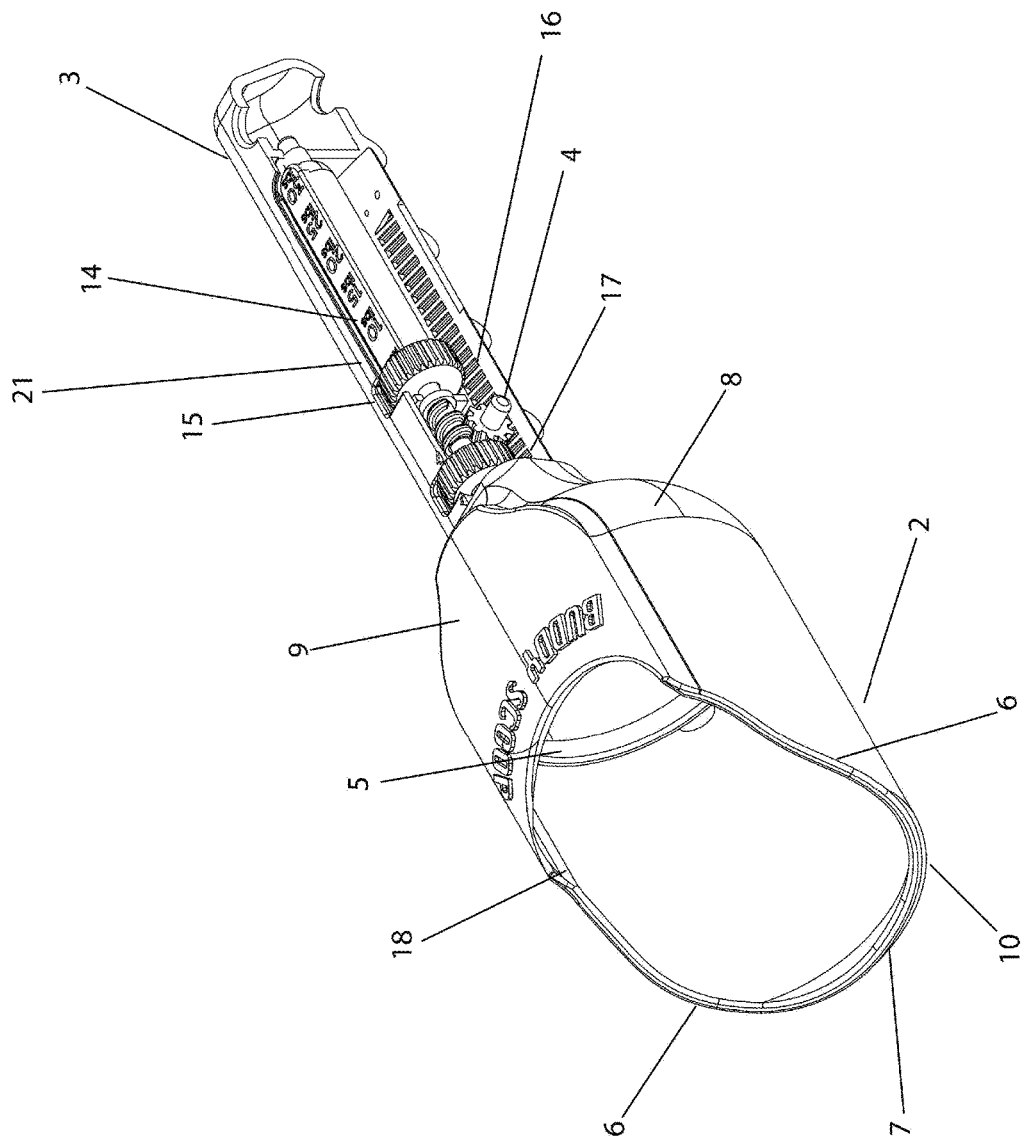
FIG. 1 shows an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 displays an adjustable measuring device 1. The device 1 can haven an elongated scoop 2, a handle 3, a cup 5, and a moveable member 4 configured to adjust a position of said cup 5. The scoop 2 being rounded forming a cylinder, with an open section. The cup 5 can be mounted inside the elongated scoop 2 and can be slidably engaged inside of the elongated scoop 2. The cup 5 can have cup side walls 11, a cup bottom wall 12, and a cup back wall 13, and can have a generally round shape. The handle 3 of the present invention can be elongated and have a gauge display 14 that allows a user to select and see what size pet the scoop is being used for, what activity level the animal might have, how many calories is expected to be scooped up, or how much volume is held in the scoop 2.

Figure 2:
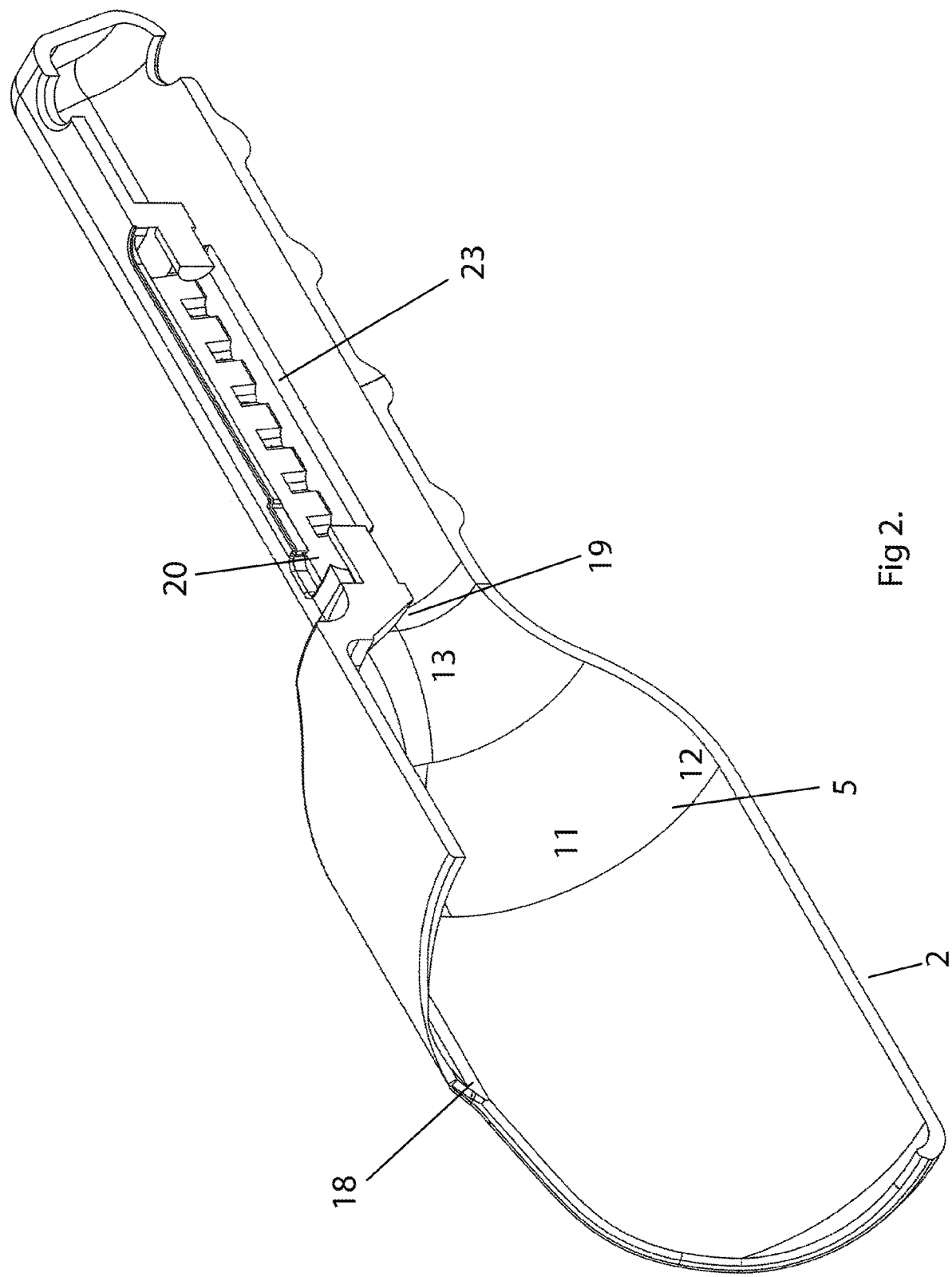
FIG. 2 shows a cut away view of the present invention of an embodiment of the present invention.

FIG. 2 shows a cut away view of one embodiment of the invention, wherein the moveable 4 member can have a round dial 15 connected to a gear system 16, and the gear system 16 can be connected a shaft 17 which can in turn be connected to the cup back wall 13. As shown in FIG. 1, the gear system 16 can be a worm gear. When the dial 15 is turned, the gauge shows how much food the scoop 2 and cup 5 combination can take in, the amount of food can be shown in calories, volume and can have a guide for how much food needs to be scooped up for an animal with various size and activity level characteristics. As the worm gear 16 is turned the cup 5 is moved back and forth by the shaft 17 which is coupled to the worm gear 16.

Further, as can be seen in FIG. 2, the cup 5 can be engaged with the scoop by a track 18 on an inner surface of the scoop 2. The track 18 helps keep the cup 5 in line and supported. The track 18 can be at the bottom or the top of the scoop. Conversely a track can be placed on each of the side walls for the cup 5 to engage with.

Also seen in FIG. 2, is a sliding member 23 can be configured to slide along the elongated direction of the handle 3. The sliding member 23 can be integrally connected to the cup back wall 13 via the elongated connection member 17. By pushing and pulling the sliding member 23 the user can also increase or decrease of they want the volume contained in the scoop 2 by moving the cup 5 back and forth. The cup 5 can be connected to the sliding member 23 through a shaft 17 which enters the scoop through an aperture 19 at the rear of the scoop 2. The sliding member 23 can comprise a sliding member, or knob, on each side of the handle 3. The sliding members 3 can be connected with a U-shaped connector that can go around the internal components of the handle 3.

Figure 3:
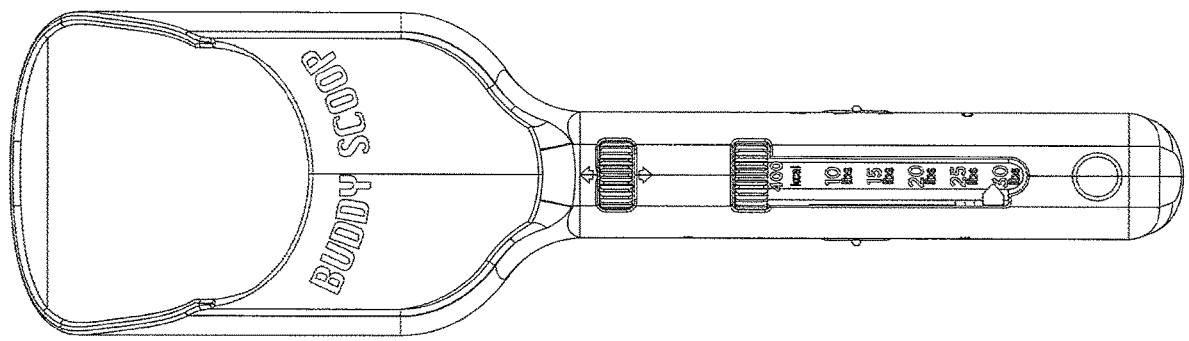
FIG. 3 shows a top perspective of an embodiment of the present invention.

As can be seen in FIGS. 1 and 3, it is yet another feature of the present invention to have the elongated connection member 23, or shaft contain a cutout. The cutout allows a portion of the gauge 14 to sit inside the shaft. This allows the mechanism to be more compact, and also gives the gauge 14 more support and structure. The gauge 14 can include magnifying glass to improve viewing, which can preferably be prism shaped. The gauge 14 can also be digital.

As can be seen in FIG. 1, the gauge 14 can have multiple faces. A gauge 14 with at least six faces, and a maximum of twelve faces is preferred. Each of the faces can be connected to a unique sliding rod, wherein each of the unique sliding rods can be connected to the cup back wall through an aperture in the rear wall. When a gauge side is selected by the user, the face is associated with a rod of particular length. Each rod is then used individually to push the cup forward and backwards.

As can be seen in FIG. 1, the cup slides back and forth from a position wherein the front edge of the cup 5 is flush with a diagonal edge of the scoop, and as can be seen in FIG. 1, wherein the second position places the cup 5 back wall 13 in contact with the scoop rear wall 8. The rear wall 8 can be approximately 80 to 95 percent higher than the front wall 7. The top wall 9 should be between 30 and percent as long as the bottom wall 10, leaving a portion of the bottom wall exposed and the inside of the scoop open.

The scoop 2 and other portions of the device can be made of plastics, resins, composites, metals, rubbers, wood, or any combination thereof. The plastics specifically include polyethylene terephthalate (PET), polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC), or any combination thereof.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. An adjustable measuring device comprising: an elongated scoop, a handle, and a cup and a moveable member configured to adjust a position of the cup;

the elongated scoop having side walls, a rear wall, a front wall, a top wall, and a bottom wall forming a cylinder;

the cup being mounted inside the elongated scoop and being slidable inside of the elongated scoop, having cup side walls, a cup bottom wall, and a cup back wall;

the handle being elongated in a direction away from the scoop, and having a gauge display.

2. The adjustable measuring device of claim 1, wherein the moveable member comprises a round dial connected to a gear system, the gear system connected to a shaft, the shaft being connected to the cup back wall.

3. The adjustable measuring device of claim 2, wherein the gear system comprises a worm gear.

4. The adjustable measuring device of claim 2, wherein the cup is engaged with the elongated scoop by a track on an inner surface of the elongated scoop and the gear system is engaged to the cup through an aperture in the rear wall of the elongated scoop.

5. The adjustable measuring device of claim 1, wherein the moveable member is configured to slide along a length of the handle and the moveable member is integrally connected to the cup back wall with an elongated connection member.

6. The adjustable measuring device of claim 1, wherein the gauge display comprises a magnifying glass.

7. The adjustable measuring device of claim 6, wherein the magnifying glass is prism shaped.

8. The adjustable measuring device of claim 1, wherein the gauge display is digital.

9. The adjustable measuring device of claim 2, wherein the gauge display comprises a rod with an outer surface comprising at least 6 sides, and a maximum of 12 sides.

10. The adjustable measuring device of claim 9, wherein each of the at least 6 sides is connected to unique sliding rods, wherein each of the unique sliding rods is connected to the cup back wall through an aperture in the rear wall.

11. The adjustable measuring device of claim 1, wherein the cup is moveable between a first position and second position;
wherein the first position locates a diagonal edge of cup flush with a diagonal edge of the scoop, and wherein the second position locates the cup back wall in contact with the scoop rear wall.

12. The adjustable measuring device of claim 1, wherein the front wall of the scoop is between 5 and 20 percent higher than the rear wall of the scoop.

13. The adjustable measuring device of claim 1, wherein the top wall is approximately 30% to 70% as long as the bottom wall.

14. The adjustable measuring device of claim 1, wherein the adjustable measuring device comprises plastics, resins, composites, metals, rubbers, wood, or any combination thereof.

15. The adjustable measuring device of claim 14, wherein plastics include polyethylene terephthalate (PET), polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC), or any combination thereof.

16. The adjustable measuring device of claim 1, wherein the handle comprises a first scale on a first side and a second scale on a second side, wherein the moveable member is connected to a sliding knob, the sliding knob positioned in a slot adjacent to the first scale or the second scale, the sliding knob being configured to adjust the cup.

17. An adjustable measuring device comprising:
an elongated scoop;
a handle;
and a cup and a moveable member configured for adjusting a position of the cup;
wherein the elongated scoop has side walls, a rear wall, a front wall, a top wall, and a bottom wall;
wherein each of the side walls, the rear wall, the front wall, the top wall, and the bottom wall are connected and curved;
wherein the cup is moveable, mounted inside the scoop, has cup side walls, a cup bottom wall, and a cup back wall;
wherein the handle is elongated in a direction away from the scoop, and has a gauge display;
wherein the moveable member is configured to slide along the handle and the moveable member is integrally connected to the cup back wall with an elongated connection member;
wherein the cup is engaged with the elongated scoop by a track on an inner surface of the elongated scoop and is engaged to the cup through an aperture in the rear wall of the elongated scoop; and
wherein the elongated connection member comprises a cutout, wherein the cutout houses a portion of the gauge display.

18. An adjustable measuring device comprising:
an elongated scoop;
a handle; and
a cup and a moveable member configured for adjusting a position of the cup;
the elongated scoop having side walls, a rear wall, a front wall, a top wall, and a bottom wall; wherein each of the side walls, the rear wall, the front wall, the top wall, and the bottom wall are connected and curved;
the cup is moveable, mounted inside the scoop, has cup side walls, a cup bottom wall, and a cup back wall;
the handle is elongated in a direction away from the elongated scoop, and has a gauge display;
wherein the front wall of the elongated scoop is between 5 and 20 percent as high as the rear wall of the elongated scoop;
wherein the top wall is between 30 and 70 percent as long as the bottom wall;
wherein the moveable member is configured to slide along the elongated direction of the handle and the moveable member is integrally connected to the cup back wall with an elongated connection member;
wherein the cup is engaged with the elongated scoop by a track on an inner surface of the elongated scoop and is engaged to the cup through an aperture in the rear wall of the elongated scoop;
wherein the elongated connection member comprises a cutout, the cutout housing a portion of the gauge display;
wherein the cup is moveable between at least a first position and a second position;
wherein the first position locates a diagonal edge of the cup flush with a diagonal edge of the scoop, and wherein the second position locates the cup back wall in contact with the scoop rear wall; and
wherein the gauge display comprises a rod with an outer surface comprising between 6-12 sides.

* * * * *